Patented Mar. 4, 1947

2,416,974

UNITED STATES PATENT OFFICE 2,416,974

MANUFACTURE OF MONO-NITRATION PRODUCTS OF TOLUENE

Harold Reginald Wright and William John Donaldson, West Kilbride, Scotland, assignors to Imperial Chemical Industries Limited, a corporation of Great Britain No Drawing. Application March 9, 1945, Serial No. 581,953. In Great Britain May 24, 1944

9 Claims. (Cl. 260—645)

The present invention relates to a new and improved liquid phase method for the production of mono-nitration products of toluene, by which there is obtained a mixture of mono-nitrotoluene isomers of unusually high para-nitrotoluene content and unusually low ortho-nitrotoluene content.

In particular the method by which the toluene is mono-nitrated according to the present invention gives, even when conducted in non-recirculating fashion, a satisfactory yield of mono-nitrotoluene isomers of considerably higher paranitrotoluene and considerably lower ortho-nitrotoluene content than the mixture containing approximately 33½ per cent para, 62½ per cent ortho- and 4 per cent meta-nitrotoluene that is obtained in the customary method for the mononitration of toluene, in which nitric acid and sulphuric acid are employed in association as the nitrating agent.

It has already been disclosed in the literature (Raudnitz. Ber. 1927, 60(B) 738) that ethyl nitrate is a very vigorous nitrating agent towards aromatic compounds suspended or dissolved in concentrated sulphuric acid kept at —5° C., the reaction not being allowed to attain a temperature higher than +5°. But we have found that toluene nitrated according to this proposal does not give a mixture of mono-nitrotoluene of the desired character.

It has also been stated Boedtker, Bull. Soc. Chim. France (4), 3, 728/1908) that if 30 grams of aluminum chloride is added to a mixture of 200 grams of toluene and 50 grams of ethyl nitrate there can be obtained 20 grams of orthonitrotoluene and 4 grams of para-nitrotoluene. Thus the principal product from toluene is the ortho-nitro compound, only small quantities of the paraisomer being formed.

We have now found that toluene can be nitrated to yield a mixture of mono-nitrotoluenes of substantially higher para-nitrotoluene content and of lower ortho-nitrotoluene content than is obtained by the nitration of toluene with a mixture of nitric and sulphuric acids by the usual methods if to an admixture of toluene and nitric ester as herein defined there is gradually added a dehydrating mineral acid while keeping the temperature at not less than about 40° C.

According to the present invention therefore the method of nitrating toluene to form a mixture of mono-nitrotoluenes of substantially higher para-nitrotoluene content and lower orthonitrotoluene content than is obtained by the nitration of toluene with a mixture of nitric and sulphuric acids by the usual methods comprises gradually adding to an admixture of toluene and a nitric ester as herein defined while keeping the temperature at not less than about 40° C. a hydrating mineral acid.

By the phrase "nitric ester" is to be understood a nitric ester of a primary mono-functional carbinol, wherein the hydrocarbon chain attached to the carbinol group is saturated and contains from one to four carbon atoms and may include a chlorine substituent.

For the purposes of the invention there may be used for instance the nitrates of normal primary saturated aliphatic alcohols from ethyl to amyl, or mono-chloro derivatives of these.

The dehydrating mineral acid is advantageously sulphuric acid and in the case of sulphuric acid, the concentration used is preferably from about 94 to 100 per cent.

In arranging the manner in which the ingredients of the reaction mixture are brought into admixture, care must be taken not to permit the toluene to remain in contact with sulphuric acid of sulphonating strength in the absence of the nitric ester, nor to mix the sulphuric acid with a nitric ester with which it can react violently, in the absence of the toluene. Thus it is necessary to mix the toluene and the nitric ester before the sulphuric acid is contacted with either of these reagents; and in order to minimise the formation of dinitrotoluenes, the acid is added gradually to a well stirred mixture of the toluene and the nitric ester. The nitration temperature is not less than 40° C., and the nitration is most easily controlled if the contents of the nitration vessel are heated to about 40° C. before the acid is first introduced.

As regards the proportions of the reagents employed, it is preferred to use a little more than 1 mole of the nitric ester per mole toluene, the excess over the equimolar quantity being reserved until after the remainder of the nitric ester and the whole of the toluene have been treated with the dehydrating mineral acid. The proportion of the dehydrating mineral acid should considerably exceed that theoretically required to react with all the nitric ester to form nitric acid and an ester of the mineral acid. The excess nitric ester may then be added to the mixture. In the case of sulphuric acid there may advantageously be used about 3 to 4 moles per mole nitric ester.

The separation of the mono-nitrotoluene isomer mixture from the refuse acid and the ester resulting from the reaction can frequently be assisted by the addition of water to the reaction mixture; and the isolation of the particular isomer or isomers from the separated mixture of isomers may be effected in known manner.

By the method of the present invention not only is the yield of para-nitrotoluene obtainable by fractionation of the mono-nitrotoluene isomer mixture increased, but also the proportion of meta-nitrotoluene in the material that is removed from the para-nitrotoluene in the course of the fractionation, so that the separation of meta-nitrotoluene is facilitated, and the yield of meta-nitrotoluene frequently may be increased. The invention is therefore of assistance when it is required to prepare either para-nitrotoluene or meta-nitrotoluene for instance as an intermediate in the manufacture of para-toluidine or meta-toluidine as the case may be.

The following examples, in which the parts are parts by weight unless when otherwise indicated, further illustrate the invention.

*Example 1*

A mixture of 104 parts of toluol and 104 parts ethyl nitrate is kept stirred in a jacketted nitrator at a temperature of 40° C., and 280 parts 98 per cent sulphuric acid is gradually run into the nitrator, the temperature being allowed to rise to a temperature not exceeding 60° C. After the whole of the acid has been added a further 6 parts ethyl nitrate are added, and stirring is continued for 10 minutes. The charge is allowed to cool somewhat and then diluted with 30 to 40 parts water. It is then allowed to separate and the aqueous acid layer is run off from the supernatant layer of mono-nitrotoluene isomers, which is next washed successively with water and dilute sodium carbonate solution until the washings are alkaline, and again with successive quantities of water until the washings are neutral. The washed layer is allowed to settle and then distilled under reduced pressure with the aid of a column. The first runnings consisting mainly of water are rejected, and the distillate collected is that coming over at 115 to 135° C. approximately at 15 to 20 millimetres pressure, which constitutes the mono-nitrotoluene isomer mixture free from toluene and dinitrotoluenes. Crystallisation commences when the distillate is cooled to approximately 10° C., and the mixture contains approximately 44½ per cent para-nitrotoluene. The isomers may be isolated from it by fractional distillation in known manner. The yield of the mono-nitrotoluene isomer mixture is approximately 94½ per cent of the theoretical.

*Example 2*

The process is carried out as described in Example 1, except that the reagents used are 104 parts toluol, 142 parts chloro-ethyl nitrate and 276 parts 98 per cent sulphuric acid, with a further 6½ parts chloro-ethyl nitrate added at the end of the addition of the acid; which is carried out at a temperature between 40 and 50° C. The distilled mono-nitrotoluene isomer mixture begins to crystallise at approximately 7½° C., and contains approximately 43 per cent para-nitrotoluene. The yield of the mono-nitrotoluene isomer mixture is approximately 94 per cent of the theoretical.

*Example 3*

The process is carried out as in Example 2, except that the reagents used are 92 parts toluol, 119 parts butyl nitrate and 250 parts 98 per cent sulphuric acid, with a further addition of 4½ parts butyl nitrate after all the acid has been added. The yield of distilled mono-nitrotoluene isomer mixture is 93½ per cent of the theoretical, and the crystallisation commences when the mixture is cooled to approximately 8° C. The para-nitrotoluene content is approximately 43 per cent.

We claim:

1. A method of nitrating toluene to form a mixture of mono-nitrotoluene of substantially higher para-nitrotoluene content and of lower ortho-nitrotoluene content than is obtained by the nitration of toluene with a mixture of nitric acid and sulphuric acids by the usual methods which comprises gradually adding sulphuric acid to an admixture of toluene and a nitric ester of a monohydroxy alcohol containing from two to five carbon atoms, while keeping the temperature at least about 40° C.

2. A method as claimed in claim 1 wherein the nitric ester is the nitrate of a normal primary saturated aliphatic alcohol from ethyl to amyl.

3. A method as claimed in claim 1 wherein the nitric ester is the nitrate of a mono-chloro derivative of a normal primary saturated aliphatic alcohol from ethyl to amyl.

4. A method as claimed in claim 1 wherein the concentration of the sulphuric acid is from 94 to 100 per cent.

5. A method as claimed in claim 1 wherein the sulphuric acid is added gradually to a well stirred admixture of the toluene and nitric ester.

6. A method as claimed in claim 1 wherein the admixture of toluene and nitric ester is heated to about 40° C. before the acid is first introduced.

7. A method as claimed in claim 1 wherein the admixture of toluene and nitric ester contains approximately equimolecular proportions of each and after the addition thereto of the sulphuric acid there is added a little more of the nitric ester.

8. A method as claimed in claim 1 wherein the quantity of the sulphuric acid used is in considerable excess of that theoretically required to react with all the nitric ester to form nitric acid and a sulphuric ester.

9. A method as claimed in claim 1 wherein 3 to 4 mols of sulphuric acid per mol of nitric ester is used.

HAROLD REGINALD WRIGHT.
WILLIAM JOHN DONALDSON.

REFERENCES CITED

The following references are of record in the file of this patent:

Randmitz, "Berichte Deut. Chem. Gesell.," vol. 60 B, 738–743 (1927).

Certificate of Correction

Patent No. 2,416,974. March 4, 1947.

HAROLD REGINALD WRIGHT ET AL.

It is hereby certified that error appears in the printed specification of the above numbered patent requiring correction as follows: Column 2, lines 4 and 5, for "hydrating" read *dehydrating*; and that the said Letters Patent should be read with this correction therein that the same may conform to the record of the case in the Patent Office.

Signed and sealed this 22nd day of April, A. D. 1947.

[SEAL]

LESLIE FRAZER,
*First Assistant Commissioner of Patents.*